(12) United States Patent
Castellanos

(10) Patent No.: US 7,096,543 B2
(45) Date of Patent: Aug. 29, 2006

(54) CLAMP

(76) Inventor: Peter Castellanos, Unit 1, 4 Flint Court, Stephens Gold Coast QLD4227 (AU)

( * ) Notice: Subject to any disclaimer, the term of this patent is extended or adjusted under 35 U.S.C. 154(b) by 0 days.

(21) Appl. No.: 10/494,038

(22) PCT Filed: Nov. 11, 2002

(86) PCT No.: PCT/AU02/01520

§ 371 (c)(1),
(2), (4) Date: May 7, 2004

(87) PCT Pub. No.: WO03/040605

PCT Pub. Date: May 15, 2003

(65) Prior Publication Data

US 2005/0028329 A1 Feb. 10, 2005

(30) Foreign Application Priority Data

Nov. 9, 2001 (AU) .................... PR8740

(51) Int. Cl.
*B65D 63/10* (2006.01)
(52) U.S. Cl. .................... 24/16 PB; 24/16 R; 24/17 A; 24/17 AP; 24/274 R; 24/279
(58) Field of Classification Search .............. 24/16 PB, 24/16 R, 17 A, 17 AP, 30.5 R, 274 R, 274 P, 24/278, 274 WB, 279–286; 248/74.1–74.3
See application file for complete search history.

(56) References Cited

U.S. PATENT DOCUMENTS 2,940,150 A * 6/1960 Rizzo ....................... 24/274 R
3,116,529 A * 1/1964 Henning .................... 24/274 R
3,162,921 A * 12/1964 Cheris ...................... 24/274 R
3,840,018 A * 10/1974 Heifetz ..................... 24/274 R
3,914,832 A  10/1975 Petrus
4,021,892 A *  5/1977 Piper ........................ 24/274 R
4,047,268 A   9/1977 Buttriss
4,197,620 A *  4/1980 Heuchert .................. 24/274 R
4,303,216 A * 12/1981 Hollingsead .............. 24/274 R
4,813,105 A *  3/1989 Espinoza .................. 24/16 PB
5,473,798 A * 12/1995 Baumann et al. ......... 24/274 R
6,763,555 B1 *  7/2004 Storer et al. .............. 24/274 R

FOREIGN PATENT DOCUMENTS

DE         3121202 C1   11/1982
DE         3400681 A     7/1985
DE      39 41 135 C1 *   1/1991  ............. 24/274 R
GB         2326438 A    12/1998
WO    WO 98/23889 A1    6/1998

* cited by examiner

Primary Examiner—Daniel P. Stodola
Assistant Examiner—Ruth C. Rodriguez
(74) Attorney, Agent, or Firm—Hoffman,Wasson&Gitler

(57) ABSTRACT

An article clamp (10) of the band type including an elongated flexible band (11) having on one side a plurality of spaced teeth (20) and a head (14) having a chamber (22) for receiving screw (23) for cooperation with the teeth (20) on the band (11), a proximal end (12) of the band (11) being connected to the proximal end (15) only of the head (14) such that the distal end (16) of the head (14) is spaced from and free of the band (11), the head (14) further having a passage (30) therethrough for receiving a distal end (13) of the band (11) to form the band (11) into a loop.

16 Claims, 3 Drawing Sheets

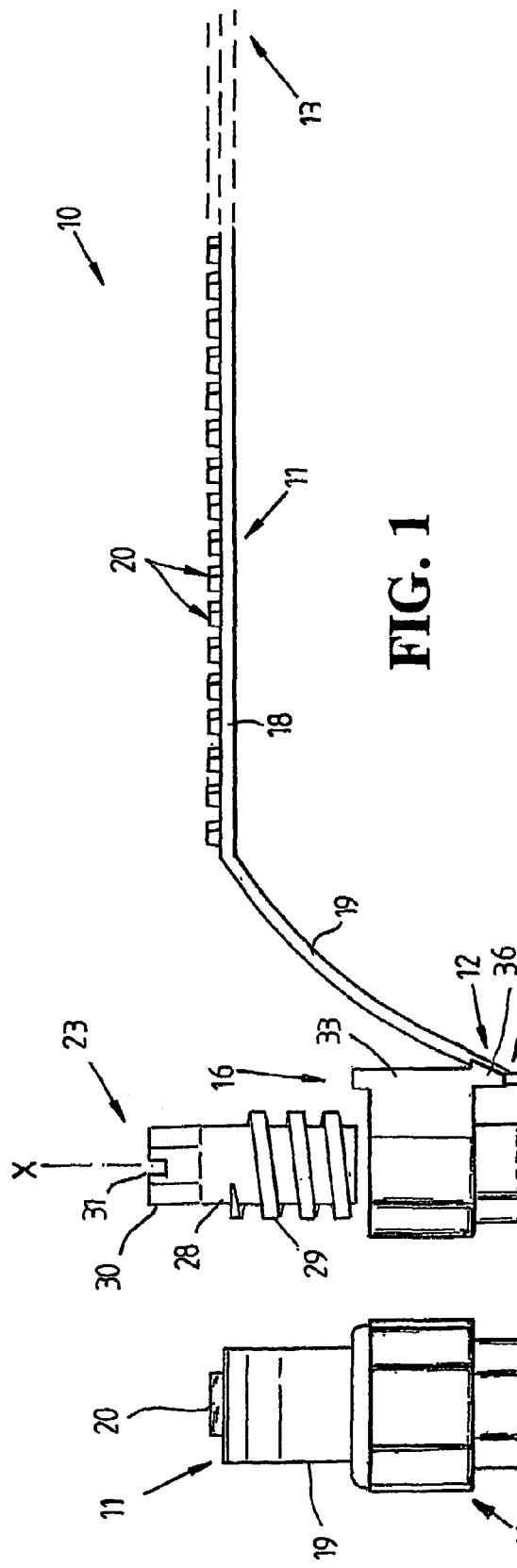
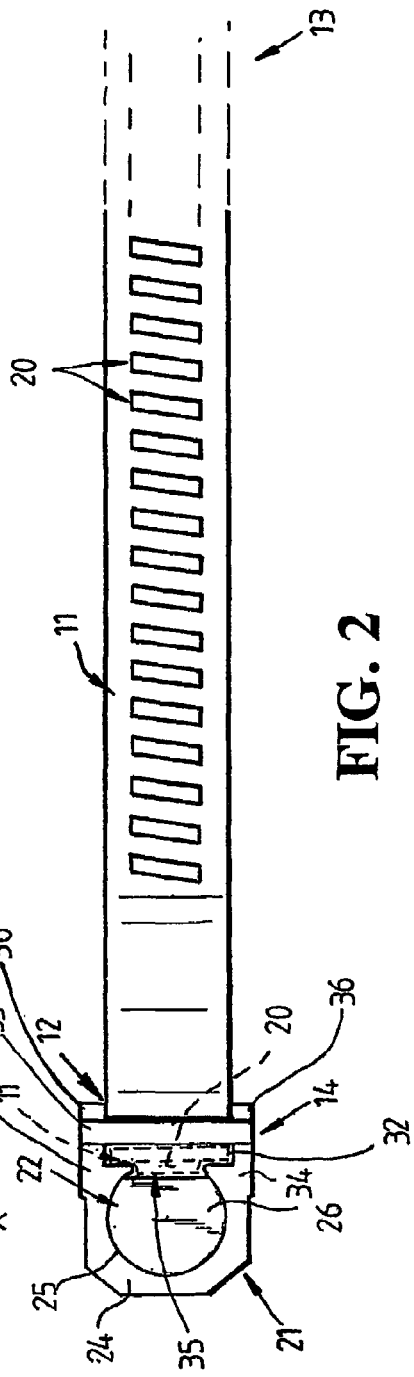

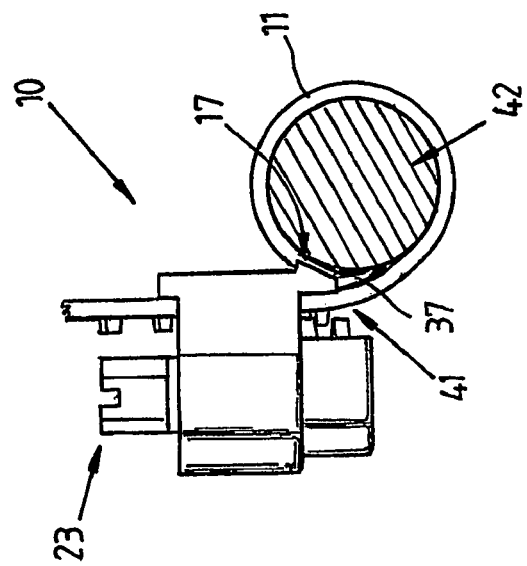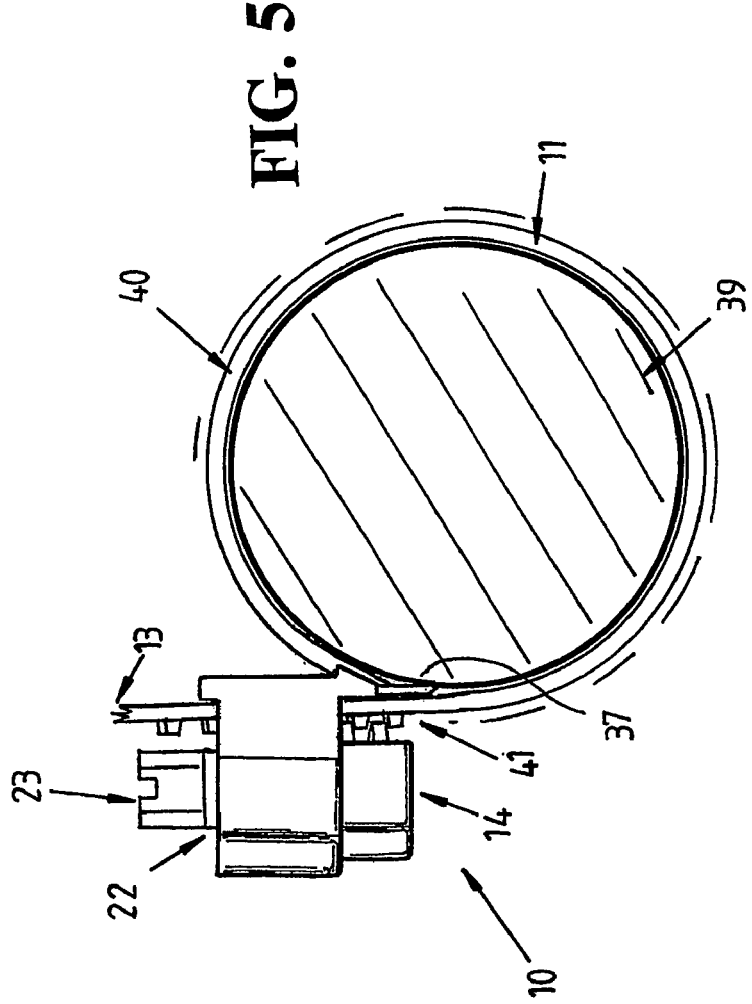

CLAMP

TECHNICAL FIELD

This invention relates to a clamp and more particularly to clamp of the type in which a band is looped around an article to be gripped such as a hose or pipe and tightened to clamp about the article.

BACKGROUND ART

A number of different designs and types of hose or pipe clamps are currently available. Generally, the known hose or pipe clamps include a metal strap which is fixed at one end to a separate metal housing, the housing defining a recess which has its longitudinal axis aligned with the axis of the strap. A worm screw is captured within the housing recess and cooperates with an end of the strap which is looped about an article to be gripped. For this purpose, the strap is provided with spaced recesses or slots for cooperation with the threads on the worm screw such that when the worm screw is rotated in opposite directions the metal strap loop is tightened to grip the article or loosened to free the article. The housing is attached to the one end of the strap by a number of different arrangements. In one arrangement, the housing has extended side flanges which are turned over on the underside of the strap and which have opposite tongues which extend into slots in the strap. Alternatively, the housing may be welded to the strap. Examples of the above type of clamp strap are shown in DE 3121202 and U.S. Pat. No. 5,473,798. Whilst these clamps generally function efficiently, they are not suited to being manufactured from plastics. Further, as a number of steps are required in their construction such as joining of the housing to the strap, the cost of manufacture of clamps of this type can be high. A disadvantage of the above clamps is that the housing in use is held against the periphery of the article being gripped however because the housing is often of planar form on its side adjacent the article, it will not lie flush with a curved surface around which the strap is looped. This can make tightening of the strap difficult and further when tightening occurs, the full circumference of the curved surface is not closely gripped because of the planar surface of the housing is in contact with the curved surface of the article.

U.S. Pat. No. 4,047,268 discloses a moulded plastics worm gear clamping apparatus in which the housing for the worm screw is formed integrally with a strap and extends a distance along the strap, the housing having a curved surface to match the surface of an article to be clamped. The strap is looped about the article and passed into the worm screw housing to be engaged by the screw which when tightened reduces the size of the looped strap to effect a clamping action about the article. As however, the housing forms part of the strap and is coextensive with the strap, tightening of the strap about the article will apply a radially inwardly directed force tending to cause a radial distortion of the housing leading to possible screw slippage. This will limit the extent to which the strap can be tightened and therefore limit the applications to which the strap can be put. This disadvantage is further amplified if the curved surface of the housing does not match a curved surface of the article being clamped. If the clamp is used with articles of smaller diameter, incomplete clamping of the article about its periphery is achieved leading to potential leakage in pressure applications. In articles of a larger diameter, again an area adjacent the driving head will not be evenly clamped. Thus a range of different clamps are required to suit the radius of each size article to be clamped. Further the angled outer surface of the housing creates additional problems in that radial distortion of the driving head will substantially increase the risk of the screw slipping or substantially reduce the pressure which can be applied by the clamp. Similar disadvantages to those referred to above are associated with the clamps shown in GB 2326438, DE 3400681 and U.S. Pat. No. 3,914,832.

International Publication No. WO 98/23889 discloses a metal strap clamp in which the strap is attached to or extends from the front end of the screw housing via a bearing or flange which is of greater thickness than the strap, the bearing or flange being curved to match the curve of an article to be clamped. The flange is formed integrally with the housing and rigid with the housing and the strap will bend about its join to the rigid flange when tightened thus limiting the extent to which the clamp can be applied to smaller articles. Thus again many different size clamps with flanges of different radii will be required to suit different size articles.

SUMMARY OF THE INVENTION

The present invention aims to provide a clamp of the type having a band which can be looped and tightened about an article to be gripped or clamped and which may be applied to articles of a large range of sizes. The present invention in a further aspect aims to provide a clamp which is constructed of a plastics material and which is therefore relatively inexpensive. Other objects and advantages of the invention will become apparent from the following description.

The present invention thus provides an article clamp comprising:

an elongated flexible band, said band having on one side a plurality of spaced teeth, said band having a proximal end and a distal end, a head having a chamber for receiving screw means for cooperation with said teeth on said band, said chamber having a longitudinal axis and said head having a proximal end and a distal end, the proximal end of said band being connected to said proximal end only of said head and extending away therefrom at an acute angle to said head such that said distal end of said head is spaced from and free of said band, said head further having a passage extending longitudinally therethrough relative to said longitudinal axis of said chamber from said proximal end to said distal end for receiving said distal end of said band to form said band into a loop, and said screw means being adapted in use to cooperate with said teeth on said band such that when said screw means is rotated in a first direction, said loop is decreased in size to clamp around a said article.

The band may include a section extending from the proximal end of the head which is of an arcuate configuration longitudinally of the band so as to enable it to more easily conform to the shape of a curved surface of an article being gripped. The head may extend generally in a tangential direction relative to the band section. The band section is suitably free of the teeth and thus is smooth on opposite sides. The band has a main body carrying the teeth and suitably the main body is of a substantially constant cross section up to its connection to the head.

The head of the clamp preferably includes a main body in which the chamber is located. A passage is suitably formed through the head to receive the band, the passage extending substantially parallel to the longitudinal axis of the chamber.

The passage is suitably of re-entrant form in cross section such that the band can be captured therein. The passage is suitably intersected along its length by the chamber thereby defining an entrance into the chamber through which the teeth of the band can project for engagement by the screw means.

The passage is suitably defined between a planar rear wall and the main body of the head, the planar rear wall extending parallel to the chamber axis. Preferably the connection between the band and the head is made between an end of the wall at the proximal end of the head and the band, the band thus extending at an acute angle away from the wall and in the direction of the head. Preferably lateral extensions on opposite sides of the band provide additional support to the band at its connection to the wall and thus the head, the lateral extensions preferably being integral with the wall and band. Preferably, a flexible finger aligned with the wall extends beyond the connection of the band to the wall, the flexible finger being sandwiched in use between the band and article clamped adjacent the head.

Most preferably, the clamp is formed of plastics material by moulding with the head formed integrally with the band. The teeth suitably comprise a plurality of raised lugs formed integrally with and extending transversely of the band. The teeth on the band are suitably in the form of transversely extending square threads. The threads may extend linearly across the band or may follow a curved path. Preferably, the teeth terminate short of opposite side edges of the band.

Preferably the chamber of the head is substantially circular in cross section so as to closely accommodate the screw means but permitting rotation thereof. Preferably the chamber is open at the distal end of the head to allow insertion of the screw means therein and is closed by a transverse wall at its proximal end for cooperation with an inner end of the screw means to resist forces applied by the screw means to the band.

Preferably, the screw means is in the form of a worm screw provided with a shank having a tread thereon for cooperation with the teeth of the band. The thread suitably comprises a square thread whose pitch corresponds to the pitch of the teeth of the band. The worm screw suitably includes a head provided with screw slot to enable rotation thereof in opposite directions with the aid of a screwdriver. The head of the worm screw additionally or alternatively may be shaped so as to be adapted for cooperation with a spanner or socket tool. The head of the screw for this purpose may have a hexagonal configuration.

The worm screw may be formed integrally with the remainder of the clamp during manufacture and may be broken off to enable insertion in the chamber of the head for use.

In a further aspect, the present invention provides a moulded plastics article clamp comprising:

an elongated flexible band, said band having a proximal end and a distal end, a head formed integrally with said band and having a chamber therein, said chamber having a longitudinal axis and said head having a proximal end and a distal end, the proximal end of said band being connected to said proximal end of said head and said band extending away from said head at an acute angle to said head relative to said longitudinal axis such that said distal end of said head is spaced from and free of said band, said head further having a passage therethrough extending from said proximal end to said distal end for receiving said distal end of said band to form said band into a loop, and a worm screw in said chamber for cooperating with said band whereby rotation of said screw in a first direction about said longitudinal axis causes said loop to be decreased in size to clamp around a said article.

BRIEF DESCRIPTION OF THE DRAWINGS

In order that the invention may be more readily understood and put into practical effect, reference will now be made to the accompanying drawings which illustrate a preferred embodiment of the invention and wherein:

FIG. 1 illustrates the clamp according to an embodiment of the invention in side elevational view with the component parts separated;

FIG. 2 is a plan view of the band and head of the clamp;

FIG. 3 is a front view of the band and head of the clamp;

FIG. 5 illustrates the clamp clamped about a first article; and

FIG. 6 illustrates the clamp clamped about an article of smaller diameter than the article of FIG. 5.

DETAILED DESCRIPTION OF THE PREFERRED EMBODIMENT

Figure 4:
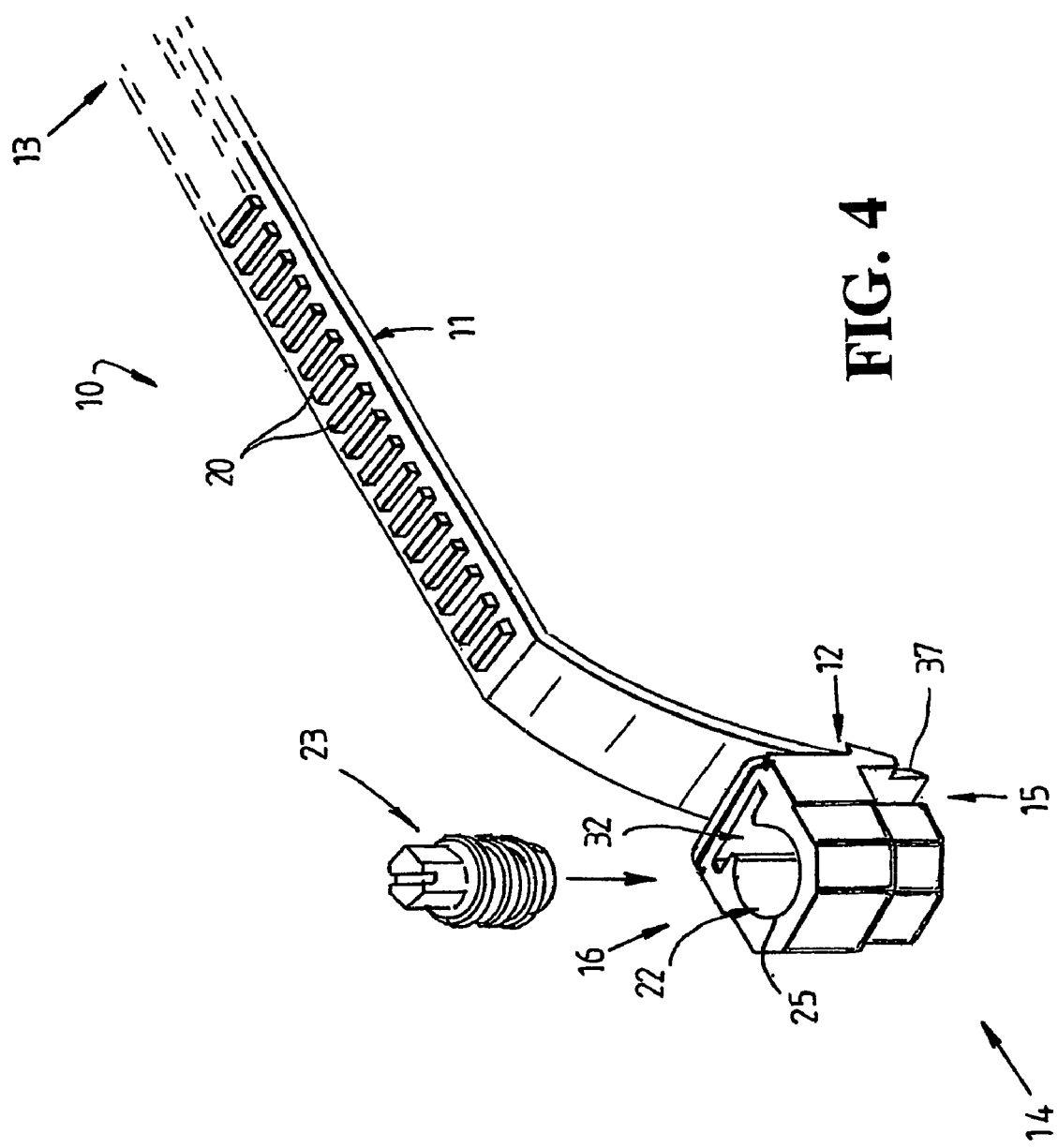
FIG. 4 is a perspective view of the band and head and associated worm screw of the clamp.

Referring to the drawings and firstly to FIGS. 1 to 4, there is illustrated a clamp 10 and components thereof according to an embodiment of the present invention. The clamp 10 may commonly be used as a hose or pipe clamp or for clamping cables or other like articles but it may be used to loop about and clamp any article or articles of any cross section. The clamp 10 comprises an elongated flexible band 11 having a proximal end 12 and a distal end 13 and an integrally formed screw supporting head 14 at the proximal end 12 of the band 11. The band 11 may as indicated by the dotted outline FIG. 1 be of any length. The head 14 has a proximal end 15 and a distal end 16 and as shown in FIG. 1, the proximal end 12 of the band 11 is only joined to the head 14 adjacent its distal end 15 at 17. The remainder of the head 14 is free of the band 11 such that the distal end 16 of head 14 is spaced from the band 11.

The band 11 includes a generally strip-like main body 18 of flat rectangular cross section which is substantially constant along the length of the band 11 and which includes a curved section 19 which is smooth on opposite sides and which includes the proximal end 12 of the band 11 which is connected to the head 14. The head 14 thus extends somewhat tangentially to the section 19 from the proximal end 12 thereof and the band section 19 and plane containing the band section 19 extends at an acute angle from the head 14 at an initial angle of about 30 degrees. The body 18 of the band 11 apart from the section 19 is provided on one side, normally the outer side, with a plurality of regularly spaced lugs or teeth 20 which project from the one side of the body 18. The teeth 20 extend transversely of and at an angle to the longitudinal axis of the body 18. The reverse or inner side of the body 18 is substantially smooth and uninterrupted. The teeth 20 are in the form of a square thread in cross section and extend linearly across the body 18 of the band 11 but terminate short of opposite side edges thereof. The teeth 20 however may be of a curved configuration transversely of the body of the band 11.

The head 14 includes a main body 21 in which a chamber 22 of generally cylindrical configuration is provided, the chamber 22 extending longitudinally of the head 14 for receiving a worm screw 23. The longitudinal axis X—X of the chamber 22 thus also extends generally tangentially to the section 19 of the band 11. The side walls 24 of the body 21 surrounding the chamber 22 are relatively thick to prevent distortion of the body 21 when stressed during tightening of the band 11. The chamber 22 is open at 25 at the distal end 16 of the head 14 but is substantially closed at the proximal end 15 of the head 14 by a transverse end wall 26. The wall 26 is also relatively thick to oppose axial forces applied by the screw 23. The body 21 in this embodiment is of stepped configuration with the lower portion 27 of the body 21 stepped inwardly and therefore having thinner side walls than the walls 24 of the upper portion where maximum forces are encountered.

The worm screw 23 has a shank 28 which carries an external thread 29 of a square configuration for complementary cooperation and mating with the teeth 20 of the band 11, the pitch of the teeth 20 being the same as the pitch of the thread 29. The worm screw 23 further has a head 30 which may include a screw-driver slot 31 and/or may be configured to cooperate with a suitable tool such as by being of hexagonal shape for cooperation with a socket tool. The maximum external diameter of the worm screw 23 including the threads 29 is slightly less than the internal diameter of the chamber 22 so that the worm screw 23 can be neatly received in the chamber 22 with a small clearance so as to permit rotation of the screw 23 but restraining the screw 23 sufficiently to maintain engagement with the teeth 20 of the band 11 in use.

A passage 32 is also formed in the head 14 to extend through the head 14 from the proximal end 15 to the distal end 16 and parallel to the chamber 22, the passage 32 being defined between a rear planar wall 33, which extends parallel to the chamber axis X—X, and the main body 21 of the head 14, the wall 33 being joined to the main body through integral side flanges 34. The chamber 22 intersects the passage 32 along its length on the inner side of the passage 32 to form an entrance region 35 such that the passage 32 is of a re-entrant form to capture the band 11 therein. The passage 32 in cross-section is similar to the cross section of the body 18 of the band 11 such that the band 11 may be neatly received therein to enable its sliding movement through the passage 32 with the teeth 20 extending through the region 35 into the chamber 22 (as shown in dotted outline in FIG. 2).

The connection between the band 11 and head 14 is defined by an integral joint between the lower end of the wall 33 and extending across the full width of the band 11. The band 11 is further supported on opposite sides by lateral extensions 36 formed integrally with the band 11 and wall 33. The extensions 36 provide additional support to the band 11 to reduce the possibility of fatigue cracking of the band 11. The wall 33 is extended on its lower side to define a finger 37, which is of the same width as the band 11, and effectively forms an extension of the band 11. The finger 37 projects beyond the connection 17 between the band 11 and the head 14 and is tapered at its free end at 38.

In use and as shown in FIG. 5, and where the clamp 10 is required to be clamped around an article or group of articles 39 in this illustration of circular cross section, the distal end 13 of the band 11 is inserted into the rear end of the passage 32 through the head 14 to form a loop 40 about the articles 39. In this position, the lugs or teeth 20 extend into the chamber 22 to be adjacent to the screw 23 for cooperation with the thread 29 on the shank 28 of the screw 23. Clockwise rotation of the screw 23 will cause through cooperation between the screw thread 29 on the shank 28 and the lugs or teeth 20, the band 11 to be advanced through the passage 32 thereby reducing the size of the loop 40 and causing the band 11 to flex about its connection to the head 14 at 17 and firmly grip around the article or articles 39. The axial reactive force along the screw shank 28 created through cooperation between the threads 29 on the shank 28 and teeth 20 is resisted by the end wall 26 of the chamber 22 thereby enabling the band 11 to be advanced and the loop 40 to be reduced in size. Further the force applied by the screw 23 is essentially applied to linear sections 34 of the band 11 adjacent the head 14 and not to curved sections of the band 11 reducing the tendency for slipping between the thread 29 and teeth 20. Thus the thread 29 on the shank 28 of the screw 23 is engaged fully with a number of teeth 20 of the band 11 This facilitates tightening of the band 11 and also application of a sufficient clamping force. Further the configuration of the clamp 10 ensures that the article or articles 39 are clamped substantially around the full circumference of the band 11 because the band 11 itself is contact in the almost the entire periphery of the articles 39 with the head 14 extending generally tangentially from the articles 32 and the formed band loop 40. Even gripping around the full circumference of the articles 39 is further facilitated by the tapered finger 37 which fills the space between the band section 41 and articles 39 adjacent the head 14.

FIG. 6 illustrates the manner in which the clamp 10 of the invention may be used to grip articles 42 of smaller diameter. It will be appreciated that the same clamp 10 as used in FIG. 5 may also be used for the articles 42. Thus as the screw 23 is rotated to tighten the band 11 about the articles 42, the band 11 will simply bend or flex further about its connection 17 to the head 14 such that the full circumference of the articles 42 can be gripped. The tapered finger 37 will also deflect to a greater extent to fill the space between the band section 41 and articles 42 adjacent the head 14. In both of the examples illustrated in FIGS. 5 and 6, gripping around substantially the full periphery of the articles 39 and 42 is particularly important where the clamp 10 is to be used for pressure applications for example clamping pressure hoses.

In an alternative method of use, the band 11 may be initially looped about the articles to be gripped with the distal end 13 passed through the passage 32 of the head 14 and tightened by hand to reduce the size of the loop 40 by pulling the band 11 relative to the head 14. The screw 23 may then be inserted into the open end 25 of the chamber 22 of the head 14 and rotated until it seats fully within the chamber 22 with further rotation of the screw 23 through cooperation between the thread 29 on the screw shank 28 and teeth 20 of the band 11 causing tightening of the band 11 about the article.

The band 11 in this embodiment may have a width of 8 mm and may be of varying lengths to suit the application such as 100, 200 and 300 mm. Alternatively, the band 11 may be simply cut to length. Further in this embodiment the threads on the worm screw 23 have a pitch of 2.5 mm to match a similar pitch of the teeth 20 on the band 11. It will be appreciated however that the clamp 10 may be made in different sizes.

In the embodiment described an illustrated, the clamp 10 is primarily suitable for tightening around an article or articles to effect clamping thereof. Rotation of screw 23 in the opposite direction to effect an increase in size of the loop 40 can only be achieved if the screw 23 is restrained against withdrawal from the chamber 22 by for example an axial force applied to the screw 23. This construction however enables the clamp 10 to be of a simplified construction permitting the screw 23 to be simply inserted into the chamber 22 of the head 14 after the band 11 is looped around the article or articles. If the clamp 10 is to be released from the article or articles, the band 11 may be simply severed by a suitable cutting tool or the screw 23 rotated counter clockwise until it is moved out of the chamber 22. In an alternative configuration, however, the screw 23 can be made captive within the chamber 22.

It will be appreciated that the teeth 20 on the band 11 may be of various different designs to suit the configuration of the thread on the worm screw 23 and may, in the case of a metal band, assume the form of grooves or slots.

The section 19 of the band 11 is shown in the embodiment to join the remainder of the band 11 at a transverse join line, however the section 19 may curve smoothly into the remainder of the band 11. The sections 19 may be of various curvatures or in some embodiments may be linear and deflected in use to lie against the article being gripped.

The body 21 of the head 14 whilst shown to be of stepped configuration may be of constant cross section through its length. Further whilst the embodiment shows a cut out region 43 between the lower portion 27 of the body 21 and wall 33, it is not necessary to have the cut out region 43 as the flanges 34 may be extended for the full length of the body 21 and wall 33.

Typically the clamp 10 is moulded of Nylon or any other suitable plastics material which provides sufficient flexibility in the band and rigidity of the head 14. The clamp 10 may be manufactured with the screw 23 formed integrally with the head 14 and associated band 11 and connected thereto by a frangible portion which allows it to be easily detached. Preferably all of the components of the clamp 10 are manufactured by injection moulding with a single die cavity forming all components. In some embodiments however, the band 11 and associated head 14 may be formed in one mould cavity and the screw 23 in a separate die cavity. In yet an alternative arrangement, the screw 23 may be formed of metal. Whilst the clamp of the embodiment has been designed to be manufactured in plastics however, it will be appreciated that the clamp may also manufactured in metal.

All other variations and modifications to the invention as would be apparent to persons skilled in the art are deemed to fall within the broad scope and ambit of the invention as herein defined in the appended claims.

The invention claimed is:

1. An article clamp comprising:
   an elongated flexible band, said band having on one side a plurality of spaced teeth, said band having a proximal end and a distal end,
   a head having a chamber receiving screw means adapted for cooperation with said teeth on said band, said chamber having a longitudinal axis and said head having a proximal end and a distal end, said screw means being operable from said distal end of said head, said chamber being substantially circular in cross section so as to closely accommodate the screw means but permitting rotation thereof about said longitudinal axis,
   said chamber being open at the distal end of the head to allow insertion of the screw means therein and being closed by a wall at said proximal end of said head for cooperation with an inner end of the screw means, and wherein the proximal end of said band is connected to said proximal end only of said head, said head and said band extending away from their point of connection to each other such that the included angle between said head and portion of said band adjacent said proximal end thereof comprises an acute angle and such that said distal end of said head is spaced from and free of said portion of said band,
   said head further having a passage extending longitudinally therethrough between said proximal end and said distal end for receiving said distal end of said band to form said band into a loop, and
   said screw means being adapted in use to cooperate with said teeth on said band such that when said screw means is rotated in a first direction, said loop is decreased in size to clamp around an article.

2. A clamp as claimed in claim 1 wherein said band has a main body carrying said teeth, said main body having a substantially constant cross section along its length up to its connection to said head.

3. A clamp as claimed in claim 1 wherein said portion of said band is of an arcuate configuration longitudinally of said band, said band section being free of said teeth.

4. A clamp as claimed in claim 1 wherein said teeth comprise a plurality of raised lugs formed integrally with and extending transversely of the band.

5. A clamp as claimed in claim 4 wherein said teeth terminate short of opposite side edges of said band.

6. A clamp as claimed in claim 1 wherein said screw means is in the form of a worm screw provided with a shank having a thread thereon for cooperation with the teeth of the band.

7. A clamp as claimed in claim 6 wherein said worm screw includes a driving head, said head being shaped so as to be adapted for cooperation with a screwdriver, spanner or socket tool for rotation of said worm screw.

8. A clamp as claimed in claim 1 wherein said head includes a main body in which said chamber is located.

9. A clamp as claimed in claim 1 wherein said passage is of re-entrant form in cross section such that the band can be captured therein.

10. A clamp as claimed in claim 9 wherein said passage is intersected along its length by said chamber to define an entrance into said chamber through which said teeth of said band project for engagement by said screw means.

11. A clamp as claimed in claim 8 wherein said head includes a planar wall spaced from said main body and wherein said passage is defined between said planar wall and said main body.

12. A clamp as claimed in claim 11 wherein said connection between said band and said head is made between said wall at the proximal end of said head and said band, said band extending at an acute angle away from said wall and in the direction of said head.

13. A clamp as claimed in claim 12 wherein lateral extensions are provided on opposite sides of said band to provide additional support to said band at its connection to said wall.

14. A clamp as claimed in claim 11 wherein a flexible finger aligned with said wall extends beyond the connection of said band to said wall, said flexible finger being sandwiched in use between said band and article.

15. A clamp as claimed in claim 1 wherein said head and said band are integrally moulded of plastics.

16. A clamp as claimed in claim 1 wherein said passage extends substantially parallel to the longitudinal axis of said chamber.

* * * * *